March 1, 1938.    J. MEERSTEINER    2,109,778
SCREW LOCKING
Filed Dec. 16, 1935
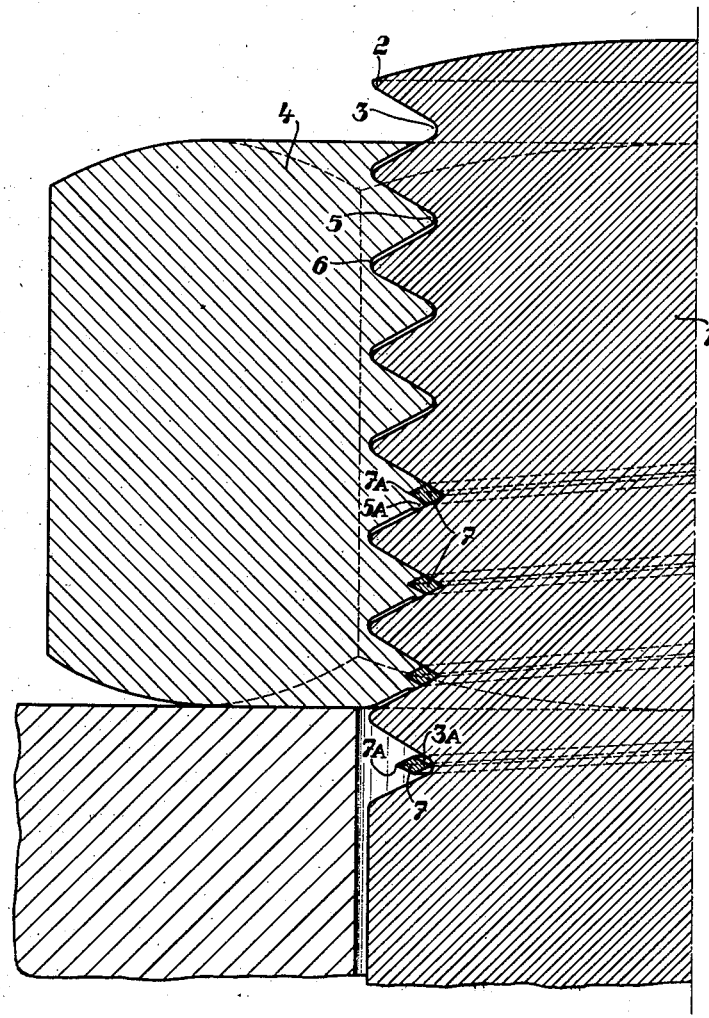
INVENTOR
Johann Meersteiner
BY
Jeffrey Kimball Eggleston
ATTORNEYS Patented Mar. 1, 1938

2,109,778

UNITED STATES PATENT OFFICE 2,109,778

SCREW LOCKING

Johann Meersteiner, Saaz, Czechoslovakia, assignor to the firm Bechert & Co., Drahtstifte-, Schrauben- und Stahlindustrie-Aktiengesellschaft, Saaz, Czechoslovakia Application December 16, 1935, Serial No. 54,575
In Czechoslovakia December 22, 1934

6 Claims. (Cl. 151—14)

This invention relates to screw locking means and the method of application thereof. One advantage of the invention is the provision of means whereby such articles as a nut and bolt, or a bolt to be screwed into a threaded socket, can be locked together by the mere application of ordinary tightening up in such a way as to render them unaffected by vibration. Another advantage is the provision of locking means which will remain effective even after repeated tightenings up of the screwed elements. Yet another advantage is the fact that the locking means can be provided either externally or on the internally threaded co-operating parts.

With the above and other objects in view, the invention consists in the provision between threads which are to interengage, of a helical length of hard wire or the like, preferably provided with a cutting edge, and adapted to be positioned in the groove of a thread or threads and upon tightening up to deform, cut or jam the projecting part of the complementary thread. The invention is illustrated diagrammatically in the accompanying drawing, which is a section through a nut and bolt for the purpose of example. In this drawing the bolt 1 has an ordinary or normal thread with land 2 and groove 3, of course helically disposed. The nut 4 likewise has an ordinary or normal thread having land 5 and groove 6. The crest i. e. top surface or edge that joins the two sides of the thread is shown as deformed by the wire 7 located between the crest and the root, i. e. the bottom of the space between the threads, and opposed to both the crest and the root.

In the groove 3 of the bolt there is wound or applied a helix of hard wire 7 which in the preferred form shown is of parallelogram section, preferably so shaped that its inner apex fits into the groove 3 of the bolt (and this groove may, over the material part of the length of the bolt, be suitably formed to this end) and its external edge likewise presenting a relatively sharp cutting profile, as can be seen at 7A. The acute V-form of the groove 3 need not be initially applied to the bolt, but may be the result of cutting action of the wire 7 upon tightening up, as is well illustrated by the position of the wire 7 in the bottom turn of the thread, represented at 3A. The method of use of this device is simply to tighten the nut on to the bolt, whereupon the wire 7 cuts the land 5 of the nut and deforms the land (as indicated for example at 5A), in such a manner as to lock the nut on the bolt as a resistance against all ordinary disturbances such as vibration.

It will be obvious that the wire 7 or one like it, may be provided in the groove 6 of the nut if desired, and it will then correspondingly cut or deform the land 2 of the bolt. It will also be clear that the wire may be made in various forms, either merely to deform the land with which it co-operates, or actually to cut it, as described above.

What I claim is:—

1. Screw locking means comprising two co-operating ordinary threads and a cutting element disposed in the groove of one of them to cut the land of the other.

2. Screw locking means comprising two elements having complementary threads, and a hard wire helix interposed between the threads when engaged, located in the groove of one and facing the land of the other, and presenting to the latter a longitudinally extended edge having a profile adapting it to cut or deform the land on relative rotation of the threaded elements.

3. Screw locking means as set forth in claim 2 having the wire helix of such cross-sectional contour as to render its opposite longitudinal edges, presented respectively to the groove of one thread and to the land of the other, cutting or deforming on relative rotation of the threaded elements.

4. For locking screw-threaded members such as a nut and bolt, the provision of a hard wire helix in the grooves of the thread of the bolt member, the wire having edges to bear against and cause deformation of the groove in which it lies, and the land of the thread of the complementary member, such that locking is effected by deformation due to the wire upon tightening up.

5. For locking screw-threaded members such as a nut and bolt, the provision of a hard wire helix in the grooves of the thread of the bolt member, the wire helix being of hard wire of four-sided cross-section and having edges to bear against and cause deformation of the groove in which it lies and the land of the thread of the complementary member, such that locking is effected by deformation due to the wire upon tightening up.

6. Screw locking means comprising a normally threaded bolt and nut with complementary threads, and a third and hard element additional to said threads interposed between the threads of said respective members, located in the groove of one, and facing the root of one and the crest of the other for locking the parts together on relative rotation of the nut and bolt.

JOHANN MEERSTEINER.

CERTIFICATE OF CORRECTION.

Patent No. 2,109,778. March 1, 1938.

JOHANN MEERSTEINER.

It is hereby certified that the above numbered patent was erroneously issued to "Bechert & Co., Drahtstifte-, Schrauben- und Stahlindustrie-Aktiengesellschaft" as assignee of the entire interest in said invention, whereas said Letters Patent should have been issued to the inventor, said Meersteiner and Bechert & Co., Drahtstifte-, Schrauben- und Stahlindustrie-Aktiengesellschaft, of Saaz, Czechoslovakia, said firm being assignee of one-half interest only in said invention, as shown by the record of assignments in this office; and that the said Letters Patent should be read with this correction therein that the same may conform to the record of the case in the Patent Office.

Signed and sealed this 19th day of April, A. D. 1938.

(Seal)

Henry Van Arsdale,
Acting Commissioner of Patents.